Patented June 1, 1937

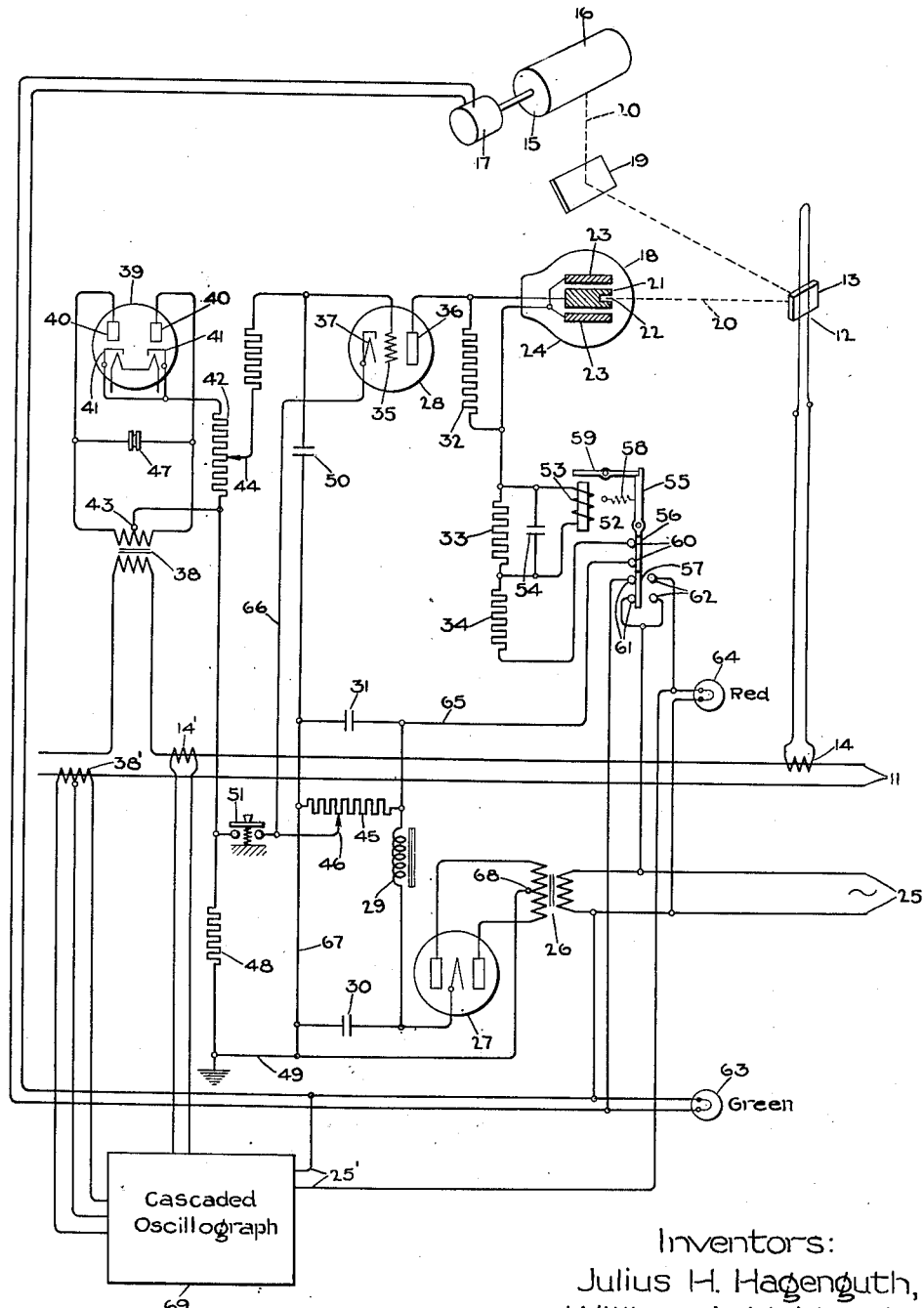

2,082,624

UNITED STATES PATENT OFFICE 2,082,624

RECORDING INSTRUMENT

Julius H. Hagenguth and William A. McMorris, Pittsfield, Mass., assignors to General Electric Company, a corporation of New York Application October 18, 1934, Serial No. 748,970

4 Claims. (Cl. 234—61)

Our invention relates to improvements in recording instruments and concerns particularly devices designed to be placed in operation upon the occurrence of the events, the character of which is to be recorded.

In order to record the conditions in an electrical transmission system as a result of a stroke of lightning or other transient phenomena, it is necessary to provide apparatus which will begin to record within an extremely short period of time as such phenomena frequently have a duration of only a few microseconds and the resulting disturbance often lasts for only a portion of a cycle of a commercial frequency alternating current. For practical reasons, the recording apparatus should be arranged to be set in operation upon the occurrence of a disturbance to be recorded and to have its operation stopped after the disturbance is over, rather than being arranged for continuous operation. The consumption of record film or strip would otherwise be prohibitive.

Our primary object, accordingly, is to provide recording apparatus in which the operation is initiated in response to and within an extremely short interval after the beginning of a disturbance to be recorded. Our object is to provide recording apparatus suitable for laboratory study of phenomena in various electrical circuits as well as for field study of electrical transmission and communication systems.

Another object is to provide a recording device of the type employing a light source as the record-producing medium in which a greatly increased speed of initiation of the light source is obtained.

Still another object is the provision of recording apparatus in which mechanical motion and thermal and mechanical inertia are eliminated in the initiation of the recording operation.

Other and further objects and advantages will become apparent as the description proceeds.

In carrying out our invention in its preferred form, we employ a source of cold light, such as a point-source or neon crater lamp in conjunction with a deflecting mirror, movable photographic film, and the usual appurtenances of a photographic recording oscillograph. In addition, means, preferably non-mechanical, are provided for energizing the light source in response to a disturbance which is to be recorded. Owing to the absence of thermal inertia in a source of cold light, and the elimination of mechanically moving parts from the lamp connecting arrangement, the lamp can be made to come up to full brilliancy and initiate the record within an interval of the order of a few microseconds.

The features of our invention which we believe to be novel and patentable will be pointed out in the claims appended hereto. Our invention will be better understood by referring to the following description taken in connection with the accompanying drawing which is a schematic diagram of one embodiment of our invention showing the electrical circuit.

Referring now more in detail to the drawing, an electrical circuit or system in which transients are to be recorded is shown at 11. The apparatus is described as used with an alternating circuit but it will be understood that the invention is equally applicable to direct current circuits. An oscillograph element 12 is provided which may be of the deflecting light-beam type, well known in the art, carrying a mirror 13 deflecting in response to variations in the quantity to be measured. If the current in the circuit 11 is the quantity to be recorded, a current transformer 14 may be provided for inductively connecting the element 12 to the circuit 11. A rotating drum 15 carrying a photographic film 16 on its surface, a film-driving motor 17, and a light source 18 are also provided. It may be found convenient to provide also a mirror 19 for changing the path of the light beam produced by source 18. It will be understood that all of the optical parts of the apparatus are to be enclosed in a light-tight box (not shown) arranged to protect the film 16 against outside light or any light from source 18 other than the beam 20 controlled by the deflecting mirror 13. The optical arrangement may be similar to that employed in oscillographs well known in the art.

For the light source 18, however, we employ a lamp producing what is commonly known as "cold light", and which does not depend on heating the elements of the lamp to incandescence to obtain light. A type of lamp which we have found satisfactory for the purpose is a neon crater or point-source glow lamp of the type disclosed in certain patents to D. McF. Moore, e. g., Patents No. 1,900,577 and No. 1,900,578, granted March 7, 1933, but it will be understood that our invention is not limited thereto. Such a lamp consists of a cathode 21 containing a sharp cavity or "crater" 22, a tubular anode 23 surrounding the cathode, and an enclosing envelope 24 containing a suitable gas, such as neon. The gas pressure is such, approximately 10 to 40 millimeters of mercury, that a glow discharge will form in the hole or sharp depression 22 in the cathode 21. Controlling means, which will be described more in detail hereinafter, are provided for causing the lamp 18 to become illuminated immediately after the occurrence of a disturbance in circuit 11, and preferably also for shutting down the apparatus after a record has been taken on the film 16.

A current source 25 is provided to supply energy for illuminating the lamp 18 and also for operating the auxiliary apparatus. The source 25 is shown as an alternating current source for the sake of illustration, but it will be understood that the apparatus may be energized directly by a direct-current source. A transformer 26 energized by the current source 25, and a rectifier tube 27 energized by transformer 26 are provided for furnishing a high potential direct-current to the cold-light source 18. For controlling the lamp 18, a grid-controlled discharge tube or electric valve 28 is connected in series with the lamp 18. Preferably also a reactance 29 is connected in series, and condensers 30 and 31 are connected in shunt with the direct-current source to smooth out fluctuations in the voltage applied to the lamp 18. A resistor 32 of relatively high resistance may be connected in shunt with the lamp 18, and a current-limiting resistor 34 may be connected in series with the lamp. A resistor 33, a relay winding 53 and a condenser 54 in parallel are included in the lamp circuit for reasons which will be explained later.

For the purpose of initiating the operation of the apparatus by causing the lamp 18 to become illuminated, a device is provided for igniting the lamp-controlling discharge tube 28 upon the occurrence of a disturbance to be recorded. The discharge tube 28 preferably includes a control grid 35, an anode 36, and a cathode 37. A current transformer 38 may be provided with a primary winding connected in series with circuit 11 and a secondary winding connected between the cathode 37 and the control grid 35 of the tube 28 to control the grid potential of tube 35 in response to disturbances in the circuit 11. To make the apparatus instantly and equally responsive to impulses of either polarity in the circuit 11, a pair of rectifiers or a full-wave rectifier 39 is preferably interposed between the transformer 38 and the electrodes of the control tube 28. The full-wave rectifier 39 may take the form of a discharge tube having a pair of anodes 40 and a cathode or a pair of connected cathodes 41.

If desired, a potentiometer 42 may be provided, connected at one end to a tap 43 brought out from the secondary winding of the transformer 38 and at the other end to the cathodes 41 of the rectifier 39, the anodes 40 of the rectifier 39 being connected to the ends of the secondary winding of the transformer 38. An adjustable tap 44 on the potentiometer 42 is connected to the grid 35 of discharge tube 28 to adjust the sensitivity of the apparatus.

A potentiometer 45 with a tap 46 is connected across the direct-current source formed by transformer 26 and rectifier 27. The potentiometer tap 46 is connected to the cathode 37 of discharge tube 28 to bias the tube 28 to its non-conducting condition except when a potential is developed in potentiometer 42 as a result of a disturbance in the circuit 11.

In order to guard against the appearance of excessive voltages in the secondary winding of the transformer 38 in response to current impulses in the circuit 11, an element 47 having a conductance increasing with voltage may be connected between the anodes 40 of rectifier 39. The resistance element 47 may, for example, be of the type disclosed in United States Patent No. 1,822,742 to McEachron, composed of a mixture of silicon carbide and carbon with a suitable binder or silicon carbide mixed with other conducting materials such as tungsten, molybdenum, and the like. To prevent the apparatus from acquiring floating potentials, the midtap 43 of the transformer 38 is connected to ground through a resistor 48 and the negative side of the direct-current source formed by transformer 26 and rectifier 27 is also grounded through a conductor 49. A condenser 50 may also be connected between the grid 35 of control tube 28 and ground to counterbalance the inherent capacity coupling between the grid 35 and the anode 36 which might tend to raise the potential of the grid and fire the tube when voltage is suddenly applied to the anode by closing the switch contacts 56 and 60. A push-button switch 51 may be provided for manually initiating the illumination of the lamp 18 for trial purposes.

For the purpose of shutting down the apparatus after a record is obtained, a time delay relay 52 of any suitable type is provided having a winding 53 connected in series with the lamp 18. A condenser 54 is also shunted across the winding 53 to compensate for the inductance of the winding 53 in order that there will be no delay in the initiation of current flow in lamp 18. The resistor 33 serves to damp out any oscillations which might be set up in the circuit formed by the inductive winding 53 and the condenser 54. The relay 52 comprises also a movable arm 55 carrying a pair of insulated contacts 56 and 57, a spring 58 biasing the movable contacts 56 and 57 to their right-hand position, a pivoted detent 59 for holding the contacts 56 and 57 in the left-hand position and adapted to be released by energization of winding 53, a pair of stationary contacts 60 cooperating with movable contact 56, and two pairs of stationary contacts 61 and 62 cooperating with the movable contact 57. The relay 52 is of the time delay type, but for the sake of clarity the arrangement for delaying its response to the flow of current in winding 53 is omitted from the diagrammatic showing in the drawing. The contacts 60 are in the circuit of the lamp 18 controlling its energization. Suitable indications or alarms, such as, respectively, green and red lamps, 63 and 64, are provided for indicating whether the apparatus is properly set for recording a disturbance, or a record has already been made. The contacts 61 of relay 52 are in a circuit from the current source 25 to the motor 17 and the green lamp 63, and the contacts 62 are in a circuit from the current source 25 to the red lamp 64.

The cathodes of the discharge tubes 27, 28, and 39 may be indirectly heated by filaments or may, themselves, constitute filaments connected to suitable current sources, such as additional secondary windings (omitted from the drawing to avoid confusion) in the transformer 26, in a manner well understood by those skilled in the art.

In order to prepare the apparatus for recording a disturbance, a fresh photographic film is first mounted at 16 on the drum 15 and the movable arm 55 of the relay 52 is then placed in the position shown with circuits closed through the contacts 60 and 61. The circuit closed through contacts 61 starts the motor 17 and lights the green light 63 to indicate that the apparatus is in readiness for taking a record. While the apparatus is held in readiness for producing a record, the filaments of the discharge tubes 27, 28, and 39 are left continuously connected to their supply sources and the film-driving motor 17 is left running continuously. Upon the occurrence of a disturbance resulting in a current exceeding a predetermined value in the circuit 11, a voltage is induced in the transformer 38 of sufficient magnitude to overcome the negative grid bias provided by the potentiometer 45, and the controlling tube 28 is caused to become conducting. As the grid 35 is connected to the transformer 38 through the full-wave rectifier 39, the potential of the grid 35 is raised regardless of the polarity at any instant of the current in the circuit 11. Thereupon a direct-current circuit is completed from the rectifier 27, through the reactance 29, a conductor 65, the contacts 56 and 60, the resistor 34, the relay winding 53, the crater lamp 18, the lamp-controlling discharge tube 28, a conductor 66, the left-hand portion of the potentiometer 45, and a conductor 67, back to the grounded negative side of the direct-current source formed by a center tap 68 on transformer 26.

Since there are no mechanically moving parts and no parts which must be heated after a disturbance occurs, mechanical and thermal inertia are eliminated and the lamp 18 acquires full brilliancy virtually instantaneously upon the initiation of a disturbance in the circuit 11. The oscillograph element, being continuously connected, follows the current in circuit 11 continuously and produces an oscillogram on the film 16 by controlling the light beam 20 produced by the source of cold light 18. During normal current variations in the circuit 11, of course, no record is produced since the lamp 18 is then dark.

A predetermined time after the initiation of the light source 18, it is extinguished, the apparatus is shut down, and a signal or alarm is given to warn the operator that a new film should be inserted and the apparatus should be reset for another record. This is accomplished by means of the time delay relay 52 connected in series with the lamp 18. After the predetermined time interval, the relay 52 trips, contacts 60 and 61 are opened, and the contacts 62 are closed. The circuit through the lamp 18 is broken at 60, extinguishing the lamp, and the circuit to the motor 17 and the green signal lamp 63 is broken at 61, stopping the motor and extinguishing the green signal lamp. The closing of a circuit through the red signal lamp 64, however, provides a warning to the operator to reset the apparatus. The signal lamps 63 and 64 may, of course, be located at a place convenient for the operator, regardless of the remoteness of the recorder. The time delay of relay 52, the speed of motor 17, and the peripheral length of the film 16 are such as to provide a recording period ample for obtaining a complete record of any anticipated transient.

If desired, separate records of successive isolated transient disturbances may be produced by separate oscillographs connected in cascade. For example, a second recording apparatus 69 of the type just described responsive to additional transformers 14' and 38' may also be set for operation with the exception that it remains without power supply until a supply circuit is closed to it through conductors 25' upon the shutting down of the first apparatus and the closing of contacts 62.

We have herein shown and particularly described certain embodiments of our invention and certain methods of operation embraced therein for the purpose of explaining its principle and showing its application, but it will be obvious to those skilled in the art that many modifications and variations are possible and we aim, therefore, to cover all such modifications and variations as fall within the scope of our invention which is defined in the appended claims.

What we claim as new and desire to secure by Letters Patent of the United States is:

1. In a device of the light-beam type for recording transients in an electrical system, a cold light producing lamp for supplying a beam of light substantially instantly upon energization of the lamp, a source of current for energizing said lamp, controlling means responsive to voltage impulses for connecting said lamp to its current source, and means for impressing voltage impulses of a given polarity upon said controlling means in response to transients of either polarity in the electrical system.

2. Transient recording apparatus comprising normally inactive first and second oscillographs each arranged for recording transients occurring on a given electrical circuit, means responsive to transients occurring on said circuit for initiating the operation of the oscillographs, and means for initially preventing operation of the second oscillograph and responsive to a recording operation of said first oscillograph, for stopping operation of the first oscillograph after a time delay and conditioning the second oscillograph for operation.

3. In a light-beam type recorder for an electrical system, a cold light producing lamp as the light-beam source, a source of current for energizing said lamp, an electric valve in series with said lamp and said current source, said valve having a control electrode, and full-wave rectifier means with an input circuit and with an output circuit connected to said control electrode, said input circuit being connected in responsive relation to the electrical system.

4. In a transient recorder of the light-beam type, a lamp for producing a deflectible beam, a source of current for energizing said lamp, an electric valve for closing a circuit through said lamp to initiate a record, a resistor, a relay including contacts and having a contact-opening winding connected in shunt with said resistor, and a condenser also connected in shunt with said resistor, said lamp source, valve, resistor, and relay contacts being in series.

JULIUS H. HAGENGUTH.
WILLIAM A. McMORRIS.